March 7, 1944.    C. OTTO    2,343,318
UNIFLOW TYPE COKE OVEN
Filed April 25, 1942
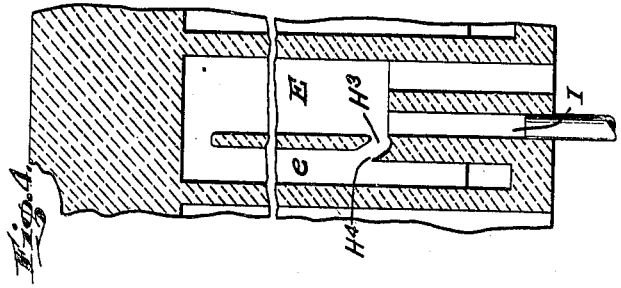
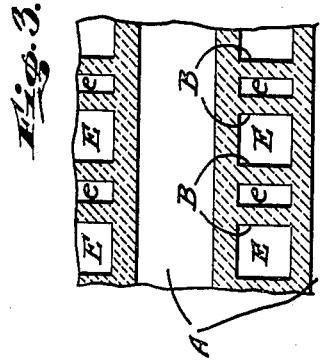
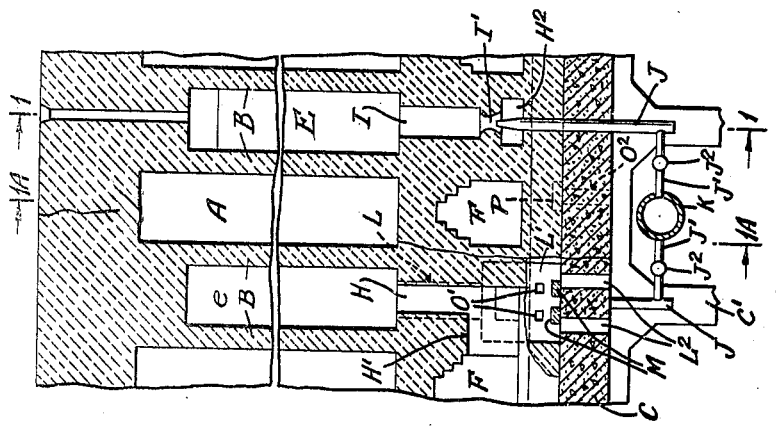
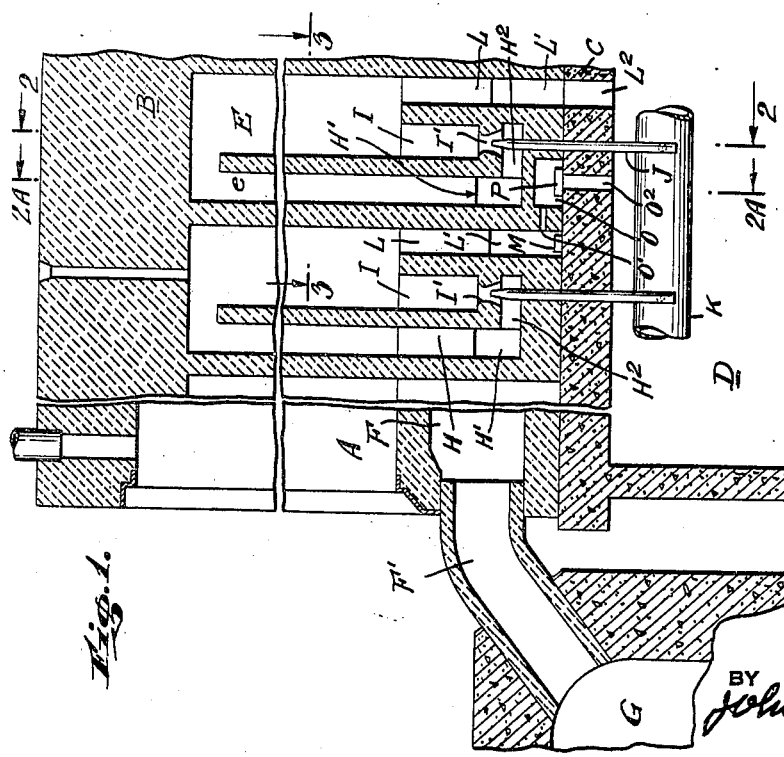
INVENTOR
CARL OTTO
BY
John E. Hubbell
ATTORNEY Patented Mar. 7, 1944

2,343,318

UNITED STATES PATENT OFFICE 2,343,318

UNIFLOW TYPE COKE OVEN

Carl Otto, Manhasset, N. Y., assignor to Fuel Refining Corporation, New York, N. Y., a corporation of Delaware Application April 25, 1942, Serial No. 440,495

3 Claims. (Cl. 202—135)

The present invention relates to coke oven batteries of the general type designated herein as the "uniflow" type, because the heating gases always flow in the same direction through the heating flues of such a battery, instead of flowing alternately in opposite directions through the flues as they do in a coke oven battery of the usual regenerative type. Coke oven batteries of the uniflow type are customarily referred to as "recuperative" or "waste heat" batteries, accordingly as they do or do not include special recuperator provisions, although waste heat batteries customarily provide for the passage of combustion air and fuel gas into the combustion flues through conduit passages in the coke oven masonry in which the air and gas are subjected to some recuperative preheating.

Coke oven batteries of the uniflow type present a special heat distribution problem in that the heating gases cool down as they move through the heating flues, and the resultant variation in heating gas temperature along the lengths of the flow paths of the heating flue system, is not compensated for in a uniflow battery as it is in an ordinary regenerative coke oven battery in which combustion is initiated and substantially completed alternately in the opposite end portions of the heating flues connecting the regenerator.

The general object of the present invention is to provide a coke oven battery of the uniflow type, with an improved heating flue system adapted to distribute the heat over the battery heating walls with suitable uniformity.

More specifically, the object of my invention is to provide the heating walls of a coke oven battery of the type specified with a series of upflow flues in which combustion is initiated, and a series of downflow flues alternating with the upflow flues and each receiving heating gases at its upper end from an adjacent upflow flue, in which the upflow and downflow flues are so proportioned and so disposed and so connected at their lower ends, as to make possible a desirable uniformity in heat distribution both vertically and longitudinally of the heating wall. In consequence of the described connections of the lower ends of the flues, a portion of the waste gases pass from the lower ends of the downflow flues into the adjacent upflow flues, and thus contribute to a suitable uniformity in heat distribution vertically of the heating walls.

My invention is also characterized by the use of downflow flues smaller in the direction of the heating wall length than are the adjacent upflow flues. This contributes materially to an improved distribution of heat longitudinally of each heating wall by increasing the portion of the coking charge alongside each heating wall which receives heat along flow paths of relatively good heat conductivity from the upflow flues, in which the average gas temperature is much higher than it is in the downflow flues.

The relatively high gas velocity in the downflow flues resulting from their relatively small cross section, somewhat increases the relatively small amount of heat transferred from those flues to the coking chambers, and may also be utilized in effecting the recirculation through the top flow flues of some of the combustion gases received from the lower ends of the downflow flues.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawing:

Fig. 1 is a partial transverse section of a coke oven battery with its right hand portion taken on the line 1—1, and its left hand portion taken on the line 1A—1A of Fig. 2;

Fig. 2 is a partial longitudinal section of the battery shown in Fig. 1, with its right hand portion in section on the line 2—2, and its left hand portion in section on the line 2A—2A of Fig. 1;

Fig. 3 is a partial section on the line 3—3 of Fig. 2; and

Fig. 4 is a partial section taken similarly to Fig. 1 illustrating a modification.

The coke oven battery structure shown in Figs. 1, 2 and 3 comprises a brick work structure comprising horizontally elongated coking chambers A and alternating heating walls B which extend transversely to the length of the battery and are supported on a reenforced concrete slab or deck C. The latter is carried by supporting columns or pillars C' which extend upwardly through the basement space D beneath the deck C.

Each heating wall B is formed with vertical upflow or combustion flues E arranged in a row extending from one end of the heating wall to the other, and which alternates with vertical downflow flues e. Each of the flues e is connected at its upper end to an adjacent flue E to form a twin or hairpin flue. While the flues e and E may well have the same dimensions measured in the direction of the length of the battery, the flues e are substantially smaller than the flues E, in the direction of the lengths of the heating walls. Beneath each coking chamber A is a horizontal sole channel F extending between the opposite sides of the battery and having an extension F' at one end for discharging waste heat gas into a waste heat tunnel G extending longitudinally of the battery to a stack or other exhausting device.

Each of the downflow flues e of a single heating wall has its lower end in communication with the sole channel F' beneath one of the oven chambers alongside said heating wall through a depending vertical passage H and a connecting port H'. Each upflow flue E and an adjacent downflow flue e which are connected at their upper ends to form a hairpin flue, are also connected at their lower ends for waste gas recirculation, by means comprising the corresponding passage H, the fuel gas supply channel I extending up to the flue E from the basement D, and a lateral port $H^2$ connecting the lower end of the passage H to the adjacent portion of the passage I.

As shown, the portion of the passage I above the level of the underside of the corresponding port $H^2$ is larger in horizontal cross section than the subjacent portion of the passage through which extends a fuel gas supply pipe J having its upper end slightly above the level of the top of the port $H^2$. The upper end portion of each pipe J serves as an aspirating or injector nozzle, utilizing a portion of the kinetic energy discharged through the nozzle J, draws a portion of the waste gas passing down from the corresponding flue e through the passage H into admixture with said fuel gas. To increase the aspirating effect of each pipe J, the portion I' of the passage I above the top its pipe J may be shaped to form the throat of a Venturi passage coaxial with the pipe.

As shown, each fuel gas pipe J is supplied with fuel gas, ordinarily coke oven gas from a corresponding distribution pipe K through an individual connection J' which includes a flow regulating element $J^2$ accessible for adjustment from the subway space, as is customary in underfired coke ovens. As shown, each of the distribution pipes K which extend transversely of the battery, and may or may not be embedded in the deck C, supplies fuel gas to two adjacent heating walls through corresponding pipes J and connections J'.

Combustion air is drawn into the lower end of each upflow flue E from the basement space D through a passage L individual to the flue. A lower portion L' of each passage L is elongated in the direction of the length of the battery to increase the amount of heat which the air will absorb from the brick work conducting heat to the passage from the adjacent channels E and passages H. Such recuperative heating of the combustion air not only desirably increases the combustion temperatures obtainable in the flues C, but also desirably cools the lower portion of the battery masonry and thus contributes to a relatively low temperature in the basement space D.

Each passage L may receive all of the air passing through it directly from the subway space through one or more ports $L^2$ extending downward through the deck structure and each provided with obtuators or throttling devices M accessible for adjustment or replacement from the subway space and employed to regulate the amount of air passing through the corresponding port $L^2$. As shown, however, some of the air drawn into the chambers L' is received through ports O' in their side walls from cooling channels O in the lower portion of the coke oven brick work. The channels O are shown as extending longitudinally of the battery in alternation with the rows of channels L and preheating chambers L'. Each channel O receives air from the subway space through ports $O^2$ in its bottom wall which may be provided with obturators or throttling devices P.

The coke oven battery shown may include charging provisions and distillation gas removal means of any usual or suitable type which need not be illustrated or described herein, as they constitute no part of the invention claimed herein.

In the operation of the apparatus shown in Figs. 1–3 contemplated as normal, fuel gas and combustion air are supplied to the lower ends of the different upflow flues E in properly regulated amounts, and products of combustion are drawn into each flue E from the associated flue e to dilute the mixture of combustion air and fuel gas and thereby retard combustion, and elongate the combination zone or flame length, in the flue E and thus minimize temperature variations along the length of the flue E.

In the operation of a coke oven having hairpin heating flues, the average gas temperature is substantially higher in the upflow flues in which combustion is initiated, is substantially higher than in the downflow flues e. With the horizontal cross sections of the upflow and downflow flues similar in shape and form, the portions of a coking charge in direct juxtaposition with the upflow flues in an adjacent heating wall thus receives heat at a rate substantially higher than do the portions of the charge directly alongside the downflow flues in said wall. This does not interfere with the proper coking of the charge in a regenerative coke oven having hairpin flues because each flue serves alternately as an upflow flue and a downflow flue during successive reversal periods, which usually are of thirty minutes each.

In my simple waste heat oven there is no reversal of the flow through the hairpin heating flues, but the difference between the average temperatures in the upflow and downflow flues is substantially prevented from producing an improper heat distribution longitudinally of the charge, by making the thickness of the downflow flues e, measured in the direction of the heating wall length substantially smaller than the similarly measured thickness of the upflow flues E. With the flues E and e relatively proportioned as shown in Fig. 3, the portions of the charge receiving heat from the upflow flues E by conduction along relatively short and direct brick work paths is much larger than would be the case if the horizontal cross sections of the upflow and downflow flues were similar. The reduction in horizontal cross section of the flues e and corresponding increase in the flow velocity in those flues, increases the amount of heat transferred from those flues to an adjacent coking charge with a given temperature differential or heat head between the flues and the charge.

The aspirating effect, or injection action of each pipe J and the associated Venturi throat portion I' of the passage I may be varied by varying the shape and dimensions of the pipe J. The latter may be formed of ceramic material.

In the construction shown in Figs. 1, 2 and 3 the port $H^2$ through which products of combustion pass from each flue $e$ into an adjacent flue E, is located appreciably below the oven floor level, and thereby facilitates a relative arrangement of the corresponding pipe J and Venturi throat I' giving an effective aspirating or injection action.

A suitable recirculation of products of combustion can be obtained in other ways, however, one of which is shown in Fig. 4. In the modification shown in Fig. 4, both the fuel gas supply passage I and the port $H^3$ through which each flue E respectively receives fuel gas and products of combustion from an adjacent flue $e$, open directly into the lower end of the flue E, and the passage I includes no aspirating nozzle pipe. In Fig. 4 an adequate flow of products of combustion from the lower end of each flue $e$ into the adjacent flue E is insured, although the static pressure is higher at the bottom of the flue E than at the bottom of the flue $e$, by shaping the inlet end of each port $H^3$ to serve as a scoop or funnel $H^4$ down through the corresponding flue $e$. In consequence, the kinetic energy of the downflowing gases in each flue $e$ is utilized in passing a portion of those gases into an adjacent upflow flue E.

The reduction in the horizontal cross section of the flues $e$ and the resultant increase in the velocity of the heating gases flowing through those flues also increases the amount of kinetic energy in the downflowing gases used in Fig. 4 in effecting recirculation of products of combustion.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. In a uniflow heat coke oven battery of the uniflow type, the combination with horizontal elongated coking chambers, of heating walls alongside the coking chambers and each formed with vertical flues connected at their upper ends in pairs to form hairpin flues each comprising an upflow flue and a downflow flue, means for supplying fuel gas and combustion air to the lower end of each upflow flue, means for returning a portion of the gases flowing down in each downflow flue to the lower end of an adjacent upflow flue and means for withdrawing the gases flowing down in each downflow flue and not returned to an adjacent upflow flue.

2. In coking oven battery combination as specified in claim 1, comprising means for utilizing the kinetic energy of the fuel gas supplied to each combustion flue to move products of combustion into that flue from an adjacent downflow flue.

3. In coking oven battery combination as specified in claim 1, in which the horizontal cross section of each downflow flue is less than that of the associated upflow flue, and comprising means for utilizing the kinetic energy of a portion of the gas flowing down through each downflow flue to move said portion of the gases into an adjacent upflow flue.

CARL OTTO.